US007582239B2

(12) United States Patent
Thomason

(10) Patent No.: US 7,582,239 B2
(45) Date of Patent: Sep. 1, 2009

(54) METHOD OF AGGLOMERATING WET CHOPPED FIBER

(75) Inventor: Darryl Thomason, Maumee, OH (US)

(73) Assignee: Johns Manville, Denver, CO (US)

( * ) Notice: Subject to any disclaimer, the term of this patent is extended or adjusted under 35 U.S.C. 154(b) by 780 days.

(21) Appl. No.: 11/129,855

(22) Filed: May 16, 2005

(65) Prior Publication Data

US 2006/0267236 A1 Nov. 30, 2006

(51) Int. Cl.
*B28B 1/08* (2006.01)
*B29C 67/02* (2006.01)

(52) U.S. Cl. .......................... 264/69; 425/222; 425/456
(58) Field of Classification Search ................... 264/69; 425/222, 456
See application file for complete search history.

(56) References Cited

U.S. PATENT DOCUMENTS

| | | | |
|---|---|---|---|
| 3,984,603 A | 10/1976 | Zechinati et al. | |
| 4,107,250 A | 8/1978 | Zechinati et al. | |
| 4,164,534 A | 8/1979 | Ogino | |
| 4,789,321 A * | 12/1988 | Dingus | 425/222 |
| 4,840,755 A | 6/1989 | Nakazawa et al. | |
| 4,997,357 A * | 3/1991 | Eirich et al. | 425/144 |
| 5,002,827 A | 3/1991 | Shimada et al. | |
| 5,185,204 A | 2/1993 | Shimizu et al. | |
| 5,578,535 A | 11/1996 | Hill et al. | |
| 5,585,180 A | 12/1996 | Fadell | |
| 5,639,807 A | 6/1997 | Secrist et al. | |
| 5,693,378 A | 12/1997 | Hill et al. | |
| 5,868,982 A | 2/1999 | Strait et al. | |
| 5,945,134 A | 8/1999 | Strait et al. | |
| 6,365,090 B1 | 4/2002 | Strait et al. | |
| 6,365,272 B1 | 4/2002 | Masson et al. | |
| 6,743,386 B2 | 6/2004 | Lease | |
| 6,942,586 B2 * | 9/2005 | Falone et al. | 473/520 |
| 7,267,539 B2 | 9/2007 | Kindle et al. | |
| 2001/0011695 A1 * | 8/2001 | Hill et al. | 248/346.2 |
| 2004/0089966 A1 | 5/2004 | Kindle et al. | |
| 2006/0130707 A1 * | 6/2006 | Grasso et al. | 106/697 |

OTHER PUBLICATIONS

"Sediment Particle Sizes", "Coastal Engineering Manual", U.S. Army Corps. of Engineers, 2006, Part III, Table III-1-2, p. III-1-8.*

* cited by examiner

Primary Examiner—Philip C Tucker
Assistant Examiner—Alison Hindenlang
(74) Attorney, Agent, or Firm—Robert D. Touslee

(57) ABSTRACT

A new system and method for making agglomerates from material like wet chopped glass fiber strand segments is disclosed and the agglomerates so produced. Agglomerates, made by feeding wet chopped fiber strand segments into a wave chamber having a vibrating curved surface supporting a curved, dimpled liner working surface have improved density and flow characteristics compared with dry chopped strands, but it was discovered that the dimpled liner flexes during operation during vibration causing undesirable variation in properties like agglomerate size. In the invention the dimpled liner is backed up with a substantially non-compressible material and this results in agglomerates that have even better uniformity of flow and agglomerate diameters. Typical backing materials include a particulate material, an elastomer, a rididized elastomer, slurry or liquid, or wire or slivers of metal.

8 Claims, 6 Drawing Sheets

METHOD OF AGGLOMERATING WET CHOPPED FIBER

The invention involves agglomerating materials including chopped strands of fiber, the resultant product and an improved apparatus having vibrating curved surface used to practice the agglomerating method. The improved apparatus can also be used for other purposes including blending of materials.

BACKGROUND

As disclosed in United States Published Application No. 20040089966 and U.S. Pat. No. 6,743,386, it was known to agglomerate, pelletize, chopped strands of fiber using a vibrating drum or curved surface. It was also known to use a dimpled or textured surface as the working surface of vibrating conveyors and on vibrating curved surfaces to prevent or reduce buildup of wet and/or sticky material including wet glass fibers to the surface. To enable the dimpled or textured surface to be easily replaced if it became worn or to use different patterns of texture, the dimpled or textured working surface was achieved by clamping the edges and tack welding at spaced apart locations on a dimpled sheet liner material, stainless steel, steel, or any other suitable material, having a dimpled pattern, or some other shape of raised portions, to the curved vibrating surface.

SUMMARY

It has been discovered that even when the dimpled or protective sheet of material providing the working surface for wet agglomeration of chopped strand is both edge clamped and tack welded at spaced apart locations on the curved surface, the dimpled or textured sheet portions between the welds flex during operation, much like the top of a tin can—popping in and out, due to the vibrating forces supplied by the vibration generator connected in known ways to the curved surface. Surprisingly, it has also been discovered that this flexing of the dimpled or textured liner has a detrimental effect on the properties of the agglomerated material, particularly the variation or magnitude of standard deviation in the properties, particularly the size uniformity, of the agglomerated material. It has now been discovered that if the dimpled or textured liner is backed up with a substantially incompressible material, the detrimental flexing is greatly reduced or eliminated and the variation or standard deviation of at least some properties of the resultant agglomerated products is substantially reduced.

The invention includes a method of installing a curved dimpled or textured liner or working surface onto the surface of a structure that will be vibrated, typically a curved surface. The invention also includes a method of agglomerating materials including wet chopped strands of fiber including glass fibers using a dimpled or textured working surface that has a relatively incompressible material between the back surface of the dimpled or textured liner and the structure that will be vibrated. The invention also includes products made from this method having a substantially lower variation or standard deviation in at least particle size distribution properties. The invention also includes the improved apparatus including a working, curved surface that is dimpled or textured and that has a relatively incompressible material against all or at least most of the back surface of the working, curved surface, including the back surface of the dimples or other textured pattern, and between this back surface and another surface that can supply vibration forces to the working surface, a vibration forces generator and a structure for supporting the vibration forces generator, the another surface, the relatively incompressible material and the working, curved surface.

The present invention includes a system and method for making agglomerated reinforcing fiber strand segments, such as agglomerated chopped strand for reinforcing plastics and products made by the method and a method for installing a liner in an agglomerating device in the system. The system comprises a chopper for chopping one or a plurality of wet strands of fibers having a chemical sizing on the circumferential surfaces of the fibers into segments, an agglomerator and a dryer for drying agglomerates of wet chopped strand segments, the agglomerator comprising a non-rotating wave chamber having a generally horizontal, non-rotating, elongated, vibrating curved working surface for contacting the wet chopped strand segments, the working surface being generally concave in cross section in a plane perpendicular with the length of the working surface, the working surface being a dimpled liner or a liner having raised portions on the working surface and lower portions between the raised portions, the improvement comprising a substantially non-compressible material backing up the liner, the substantially non-compressible material being between the liner and a vibrating curved surface that supports the non-compressible material and the liner. The term "wave chamber" designates the type of action that the working surface produces in the chopped strand segments and agglomerates, moving the material upward on the working surface like an ocean wave and curling it over the top to slide back downwardly inside the chamber to the working surface where the wave action is repeated again and again until the agglomerates exit the wave chamber.

By generally horizontal is meant horizontal plus or minus up to about 10 degrees. Preferably the working surface declines from an upstream end to a downstream end by a variable amount up to about 6 degrees. By non-rotating is meant that the wave chamber does not rotate a full revolution, preferably doesn't rotate more than 180 degrees and most preferably doesn't rotate more than about 10 degrees. The preferred embodiments disclosed herein rotate, if at all, only due to the amplitude of vibration and spring action and any rotation is slight and reciprocal, i. e. back and forth. By generally concave surface is meant that the working surface in cross section can have a constant radius or a changing radius of two or more radii. By wave action is meant a type of action similar to breaking ocean waves.

The working surface of the agglomerator has a dimpled or textured or other form of a non-stick surface to reduce the tendency of the wet chopped strand segments to stick and build-up which would detract from achieving a wave action in the chopped strand segments and agglomerates. The frequency and/or amplitude of vibration can preferably be varied to produce and optimize the wave like movement of the wet chopped strand segments and agglomerates.

Typically the dryer for drying the agglomerated wet chopped strands is a vibrating, flat bed dryer known for drying wet chopped strand segments. The system can have additional equipment at the dryer's downstream end or downstream of the dryer for sorting the agglomerated chopped strand segments to remove oversize and undersize pieces. The system can also have conveyor means for collecting the wet chopped strand segments from the chopper and delivering said segments to the vibratory wave chamber.

The method of the invention includes chopping one or a plurality of strands of wet fiber into wet chopped strand segments, the wet segments also containing a chemical sizing on circumferential surfaces of the fibers, forming the wet segments into agglomerates by subjecting a layer of the wet segments to vibration against an elongated generally concave working surface, the working surface comprising at least about a 60 degree arc circle with at least about 45 degrees of the arc being on one side of an imaginary vertical line extending through the lowest point on the working surface and the remainder, if any, lying on the opposite side of the vertical line, the working surface being a liner attached to a second elongated vibrating curved surface having a similar curvature as the liner, the improvement comprising placing a backing of substantially non-compressible material between the liner and the second elongated vibrating curved surface. The backing material is preferably a particulate material, but can be a liquid that sets up to a rigid material or an elastomer that can be hardened after installation or attached to the liner. If particulate, any reasonable particle size and particle size distribution is suitable, but most typically the particles will have a particle size distribution that produces good or excellent packing efficiency, i. e. packs with vibration to a high or at least 50-80, 85 or 90 percent of the maximum bulk density possible for the density of the material. The particles are typically as fine as at least minus 10 mesh and more typically as fine as at least minus 20 or 30 mesh with at least about 25 weight percent being minus 100 mesh. It is also practical to use material as fine as 140 mesh (U.S. Std.) more typically minus 200 mesh and even minus 325 mesh or finer. Wherever particles are described as minus a mesh size, it means at least 95 weight percent of the material passes through a screen of that mesh size. Also, fibers can be used if the diameter is less than about 30 microns, most typically less than about 19 microns and the length being less than about 0.59 inch, more typically less than about 0.29 inch and most typically less than about 0.15 inch. Glass fibers are particularly useful, but other stable fibers could also be used such as ceramic fibers, carbon fibers, refractory fibers and non-compressible natural and polymer fibers.

The general appearance of the agglomerates in shape and size is similar to that of wild rice or grains of wheat. The agglomerates are typically about ⅛ to about ½ inch long and typically about ⅛ to about ¼ inch long, but could be from 1/16 inch to more than ½ inch long. The diameter of the agglomerates can vary and can be changed to address the needs of different applications, but typically are less than about 3/16-¼ inch in diameter and most typically between about 0.06 inch to about 0.2 inch. The agglomerates of chopped fiber strand segments produced by the system and method of the invention have substantially reduced fuzz content and segments of only a few fibers. The novel agglomerates, made by the method described just above and a part of the invention, have substantially improved bundle size uniformity compared with agglomerates made with the same system, but without the substantially non-compressible layer between the liner and the second elongated vibrating curved surface. The improved agglomerates also have improved performance characteristics as reinforcements in various plastics and other matrices. Agglomerates run through conventional sorting devices to remove fuzz clumps, fines or lumps are further improved only a very small amount, because the agglomeration tends to eliminate fines and fuzz and the above method and system produces hardly any oversized lumps. The agglomerates made according to the invention have fewer particles per given weight, while being within the above described diameters, than agglomerates made in the same manner, but without a substantially non-compressible layer backing up the dimpled liner.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE INVENTION

Figure 1:
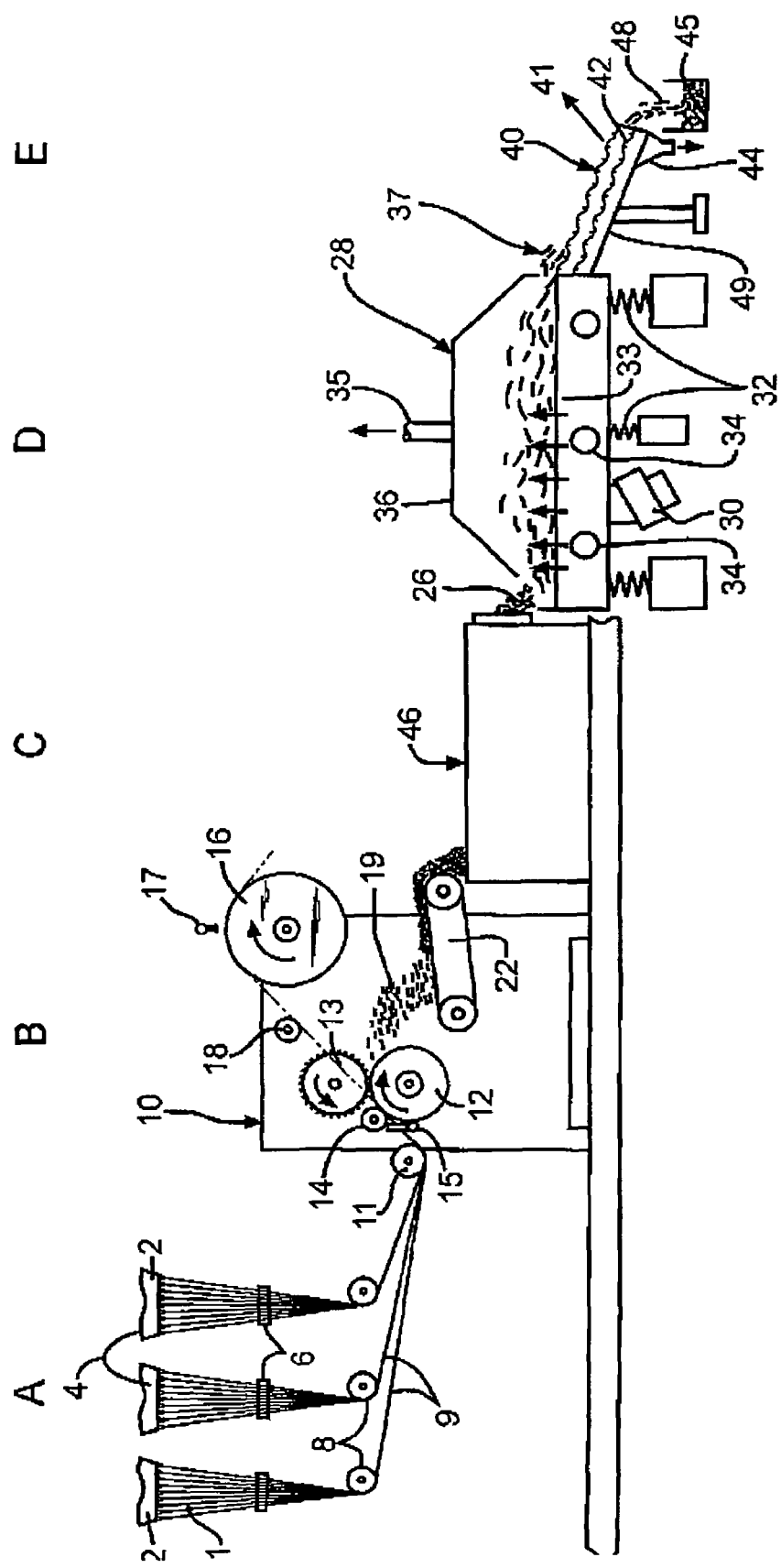
FIG. 1 is a schematic of an agglomerating system for wet chopped items containing the invention.

FIG. 1 shows an agglomerating system used to manufacture agglomerated chopped strand products with different process portions labeled as A, B, C and D. Portion A is the fiber forming part of the system. Portion B is the chopping part of the system. Portion C is the agglomerating part of the system and portion D is the drying, sorting and packaging part of the system. Fibers 1, such as glass or polymer fibers, are formed by passing the molten form of the material through nozzles 2 in the bottom of bushings 4, fiberizers, in a known manner and the fibers 1 are pulled rapidly to attenuate the fibers to the desired diameter and to quickly cool the fibers 1 with air to below their softening point. A fine mist of water is sprayed on the fibers to help cool them and the fibers 1 are rapidly pulled into contact with the roller of a chemical sizing applicator 6 where the surfaces of the fibers are coated with any one of numerous conventional chemical sizings. The sizing is usually water based and typically contain a resinous film former, a silane and one or more surfactants or wetting agents, cross linkers, etc. The type of sizing used is determined by the type of polymer or other matrix that the fibers will be used to reinforce as is well known. The present invention is applicable to a broad range of sizing compositions. The sizing composition is not a part of the present invention but rather the present invention is applicable to many known sizings.

The chemically coated, wet fibers are next pulled around a grooved pulley 8 that gathers all of the fibers 1 from the bushing 4 into a single strand 9. The fiber strands 9 can contain any number of fibers from a few hundred to more than 4000. The fibers 1 and the fiber strands 9 are usually pulled at the desired speed by the chopper in part B of the system, which in this case is a chopper 10. The strands 9 may be pulled over a strand guide roll 11 that keeps individual strands 9 separated. Chopper 10 is a known fiber strand chopper comprising a backup roll 12, a blade roll 13, a knurled idler roll 14, a strand moving finger 15, a strand starting roll 16, a roll starting switch 17, and a new strand grooved roll, 18. The chopper 10 and its operation are disclosed in detail in U.S. Pat. No. 6,148,640, the disclosure of which is hereby incorporated herein by reference. Any chopper suitable for chopping strands of fibers is suitable for use in the present invention.

Figure 2:
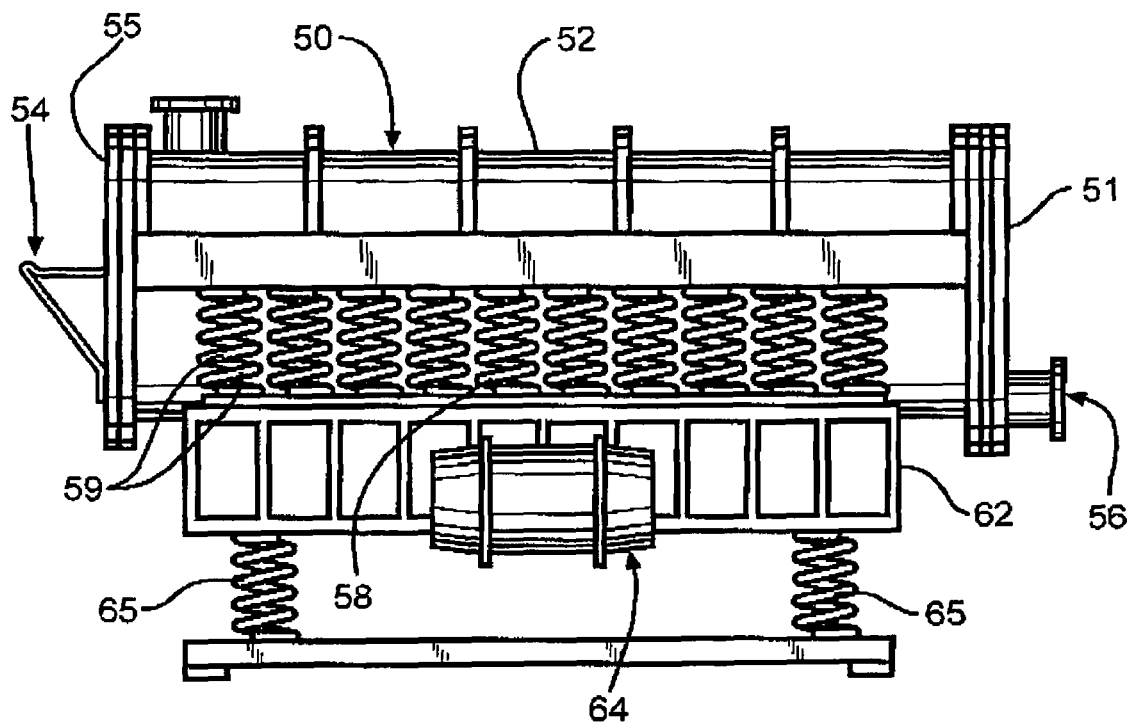
FIG. 2 is a front vertical view of an agglomerating device having a curved working surface and used in the system of FIG. 1.
Figure 3:
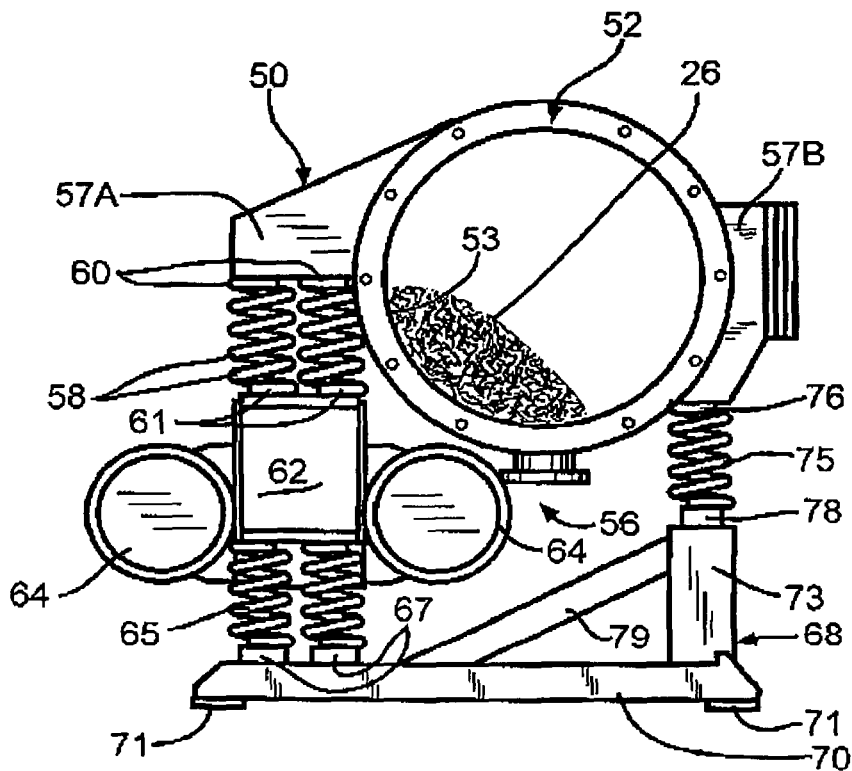
FIG. 3 is an end view of the device shown in FIG. 2.

The chopper 10 separates the wet fiber strands 9 into wet segments 19 of desired length. The fiber strand segments 19 are collected on a belt conveyor 22 and transported to part C of the system, a non-rotating agglomerator for chopped strand segments 19. The agglomerator 46 shown here is a wave chamber 10 agglomerator 46, a device that provides an elongated vibrating curved working surface causing a wave like action described herein which causes the wet chopped fiber strand segments 19 to agglomerate into wet, slightly flattened, shaped agglomerates 26 of desired size to form the desired, dry agglomerated product 37. One type of device found by the inventors to be particularly suitable as the agglomerating device 46 in the present invention is shown in FIGS. 2 and 3 with more detail of the interior shown in FIG 4. This type of device is available from General Kinematics Corp. of Barrington, Ill. under the name of Vibra-Drum®, the vibrating drum device normally used as a milling or grinding device for stone and minerals.

A Vibra-Drum® 50 is shown in front view in FIG. 2 and in an end view looking at the exit end with a front panel removed in FIG. 3. The device 50 is comprised of a generally horizontal cylindrical wave chamber 52 (chamber) having a feed port 54 in an entrance end cap end 55 and an exit port 56 at the bottom or 6 o'clock position on a downstream end cap 51. The wave chamber 52 can be of various diameters depending upon the capacity desired and the length of the wave chamber. Generally horizontal means that the cylindrical wave chamber 52 can be horizontal, but preferably several degrees from horizontal such as less than 10 degrees from horizontal. Diameters of about 24 to 42 inches are known to be satisfactory and it is believed that other diameters would also be satisfactory, such as smaller than 24 inches and larger than 42 inches in diameter.

Normally the cylindrical wave chamber 52 will decline from an entrance end to an exit end. The angle of declination will affect the retention time of the wet chopped strand segments 19 and wet agglomerates 26 in the cylinder 52 and preferably is adjustable. The chamber 52 has a working surface 53 on its interior. The chamber 52 is mounted on a frame piece 57A attached to one side of the chamber 52 and on a second frame piece 57B attached to an opposite side of the chamber 52. The frame piece 57A is supported by an array of coil springs 58. The array of coil springs 58 comprises a plurality of coil springs 59, preferably arranged in two spaced apart and parallel rows. Each of the coil springs 59 are attached on their top ends 60 to an underside of the frame piece 57A. Bottom ends 61 of the coil springs 59 are attached to the top of an elongated box like frame structure 62 having a length at least as long as the length of an array of the coil springs 58.

Mounted on opposite sides of said structure 62 and generally straddling an end-to-end vertical imaginary centerline of said structure 62 are two eccentric vibrators 64. The structure 62 and pair of vibrators 64 are supported on an underneath side by two pairs of coil springs 65. Each pair of coil springs 65 is located close to each end of the box channel member 62 as shown in FIG. 2. The two pairs of coil springs 65 are attached on their lower ends 67 to a frame 68. The frame 68 is comprised of a bottom member or plate 70 with a foot 71 on the underneath side at each corner of the bottom member 70 and two spaced apart upright legs 73 attached to the top of the bottom member 70. The upright legs 73 can be spaced apart about as much as the two pairs of coil springs 65 with each leg 73 being aligned with each coil spring in the pair of coil springs 65, but spaced apart such that each of the legs 73 is on the opposite side of the bottom member 70 from the pair of coil springs 65 it is aligned with.

The second frame piece 57B is supported on its bottom side by at least two spaced apart coil springs 75 with the top 76 of each coil spring 75 being attached to the underneath side of the frame piece 57B and the bottom of each coil spring 75 being attached to the top 78 of one upright leg 73. The upright legs 73 can be further supported by arm braces 79 attached at one end close to an upper end of each leg 73 and at the other end to a spot on the upper side of the bottom member 70 spaced from the upright leg 73 as shown in FIG. 3.

The generally horizontally wave chamber 52 is therefore totally supported by coil springs which produce a wave like action on the wet chopped strand segments 19 that are fed through the feed port 54 and also on the wet agglomerates 26 as they approach the exit port 56. A particular advantage of the VibraDrum® device shown above is that because of the array of coil springs 58 located between the vibrators 64 and said wave chamber 52, the vibrators 64 are smaller, requiring less electrical energy usage than if the vibrators were attached rigidly to said wave chamber 52. The wave chamber 52 on VibraDrum® equipment can arranged to be on either the right of the vibrators 64 or on the left, looking from the feed end, usually dictated by the orientation of the equipment feeding the chopped strand segments to the wave chamber 52. The unit shown in FIGS. 2-3 is a right hand unit. Vibrating wave chamber equipment are advantageous compared the tumbling devices used in the past because they are easier to operate and maintain.

Figure 9:
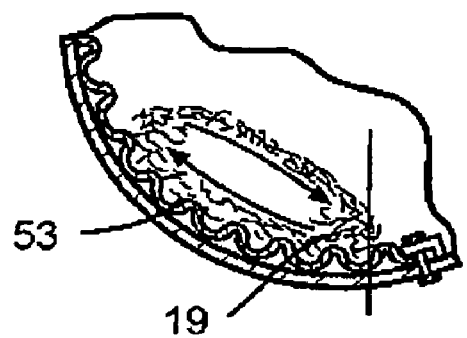
FIG. 9 is a partial cross section of a vibrating curved surface prepared according to the invention and showing the wet segments being agglomerated.

FIGS. 3 and 9 show typical positions of the wet agglomerates 26 and wet chopped strand segments 19 in an operating VibraDrum® with the array extending from about 5 o'clock to about 9 o'clock on a curved working surface 53, typically a dimpled liner inside the tubular shell of the wave chamber 52. Thus, typically about 120 degrees of the curved surface inside the wave chamber 52 is a "working" surface and the remainder of the curved surface, at this feed rate, does not necessarily contact the wet chopped strand segments 19 or the wet agglomerates 26 and therefore can be modified in many ways. The feed rate will vary depending upon the size and length of the generally horizontal wave chamber. Also, even fewer degrees of the curved surface will be a "working" surface at reduced feed rates or if a longer wave chamber at greater declination is used. For example, as little as about 45-70 degrees of contact with the working surface is suitable, as is about 45 to about 120 degrees, but about 90 to about 100 degrees or about 90 to about 110 degrees is preferred. A working surface of at least about 60 degrees with at least about 45 degrees being on a working side of a vertical centerline running through the wave chamber is also suitable.

The important thing is to obtain a wave like movement inside the wave chamber, as shown in FIG. 9 on or adjacent a portion of a wave chamber having a working surface 53. The wet chopped fiber strand segments 19 are moving in a wave like pattern as shown by the arrows, working their way up the curved working surface 53 until they reach a maximum height based on the feed rate and the vibration frequency, then curling over and flowing down the inside over the upwardly moving segments 19 until they again contact the working surface 53 and repeat the pattern. This occurs many times down the length of the wave chamber 52 until the now agglomerates 26 reach the exit. Preferably one or more rubber dampers supplied by the manufacturer can be used between adjacent coils of one or more of the coil springs if the vibrating tube tends to rock back and forth from side to side in operation.

At any given feed rate, the angle of declination of the wave chamber is adjusted to give the residence time needed to form the agglomerates described above. Typically, a residence time of up to about 120 seconds, preferably about 40-60 seconds is preferred, but this can change depending on the type of segments being processed, other machine variables and the desired size and/or shape of the finished agglomerates. While declinations up to 10 degrees are possible, lower declinations of up to about 5 or 6 degrees are more typical. With a 36 inch diameter VibraDrum®, a preferred declination angle is about 4.5 degrees. The vibration frequency can be varied to produce the wave action by changing the RPM's of the vibrator motors that are typically variable speed motors. Vibration frequencies in the range of about 500 to about 1200 RPM are normally suitable to achieve the wave action. A typical vibration frequency on a 36 inch diameter unit is in the range of about 875-925 RPM with a range of about 885-905 RPM, such as about 890-895. A frequency of 893 RPM proved especially effective with a moisture content of 12.5-13.5 wt. percent and a declination angle of about 4.5 degrees on a 36 inch diameter by 10 foot long VibraDrum® unit.

Following agglomeration, the agglomerated chopped strand agglomerates 26 (agglomerates), which are still wet, must be dried. This is accomplished by feeding the agglomerates 26 into part D, a dryer. Many types of dryers have been used and one of the frequently used dryers is a vibrating fluid bed dryer 28. This type of dryer 28 transports the agglomerates 26 on or above a perforated flat bed 33. The transporting force is supplied by an eccentric motor 30 acting on the dryer 28 that is mounted on springs 32. The drying and suspension of the agglomerates 26 in the dryer 28 is accomplished with hot air forced through ports 34 into a chamber 35 and on through perforations in the perforated flat bed 33 and a layer of the agglomerates 26 and finally through one or more exhaust stacks 35 in a hood 36 of the dryer 28. The chemical sizing in the agglomerates provides a weak bond in the agglomerates 26 that keeps them from breaking apart with handling, but allows the fibers to break apart and disperse in the polymer to which the agglomerates are later added.

The dry agglomerates 48 can be packaged immediately as they exit the dryer 28, or they can be run through an optional part E which is a sorter screen of any of various known types, such as the inclined multi deck sorter screen 49 comprising a top screen 40 to remove any lumps or clumps of fuzz that might be in the agglomerates through a side exit 41, a lower screen 42 which allows any fines in the dry agglomerates 37 to pass through to a bottom chamber into a funnel 44 to a scrap bin (not shown). The sorted agglomerates 48 pass out of the sorter screen and into any package, such as a kraft box 45. Auto packaging equipment can also be used in the system of the invention.

The moisture content of the wet chopped fiber strand coming from the chopper varies from about 10 wt. percent to about 16 wt. percent. Generally, the greater the moisture content the faster the chopped strand will agglomerate and the larger will be the agglomerates with the same residence time and vibration frequency. Preferably the moisture content is within the range of 12-15 percent, and in production units of 36-50 inches inside diameter of the vibrating curved surface or larger, the moisture content should not exceed about 15 wt. percent. When using a 36 inch diameter unit, the most preferred moisture content is in the range of about 12-13.5 wt. percent in the chopped fiber strand coming from the chopper and entering the wave chamber agglomerator.

Typically, the agglomerates 26, after drying to form agglomerates 48 or 50 will be about ⅛ inch to about ¼ inch long with the majority of the agglomerates having diameters of from about 0.06 inch to about 0.2 inch, but longer agglomerates up to about ½ inch are suitable for some applications. Preferably, at least 75 weight percent of the agglomerated product is in agglomerates of this diameter, more preferably at least 85 weight percent and most preferably at least 90 weight percent.

Any vibrating elongated, concave, curved, surface is suitable for agglomerating the wet chopped strand segments 19. It is preferred that the non-rotating curved surface be a side of a cylinder or a segment or arc of a cylinder having a cross section of a circle, a portion of a circle, a semi-circle, or less than a semi-circle. However, curved surfaces having two or more radii are also suitable.

In the invention, the working surface 53 is textured such as with small spaced apart dimples, ridges, X shaped or some other spaced apart raised forms to present reduced contact which prevents sticking of the wet chopped strand segments or partial agglomerates from sticking on the curved surface, yet providing a better gripping surface to enhance a lifting of the segments and agglomerates up the curved surface to optimize the wave action. In FIGS. 4-11, the degree or amplitude and size of the dimpled working surface is exaggerated from what is typical for purposes of better illustration. The dimples, or pillows, typically have an amplitude of only a few mils or small fractions of an inch. Because the wet segments are often abrasive and cause wear to the curved surface over time, and because of the cost of providing a dimpled surface on the inside of the vibrating curved surface of the agglomerator, it is good practice to use a replaceable liner, see the liner 53 in FIGS. 3 and 4, as the curved working surface. Various "Toe or Kick Plates", sized and formed into a curved surface with the raised texture on the concave surface, are suitable. The preferred material is stainless steel, but other metals coated with non-corrosive coatings or various plastics, reinforced or not reinforced would also be suitable as would be various types of rubber known for use in wear resistant applications. A typical dimpled material for use as the working surface is a 304 stainless (#4) 5WL product available from the Rigidized Metals Corp. of Buffalo, N.Y.

Figure 4:
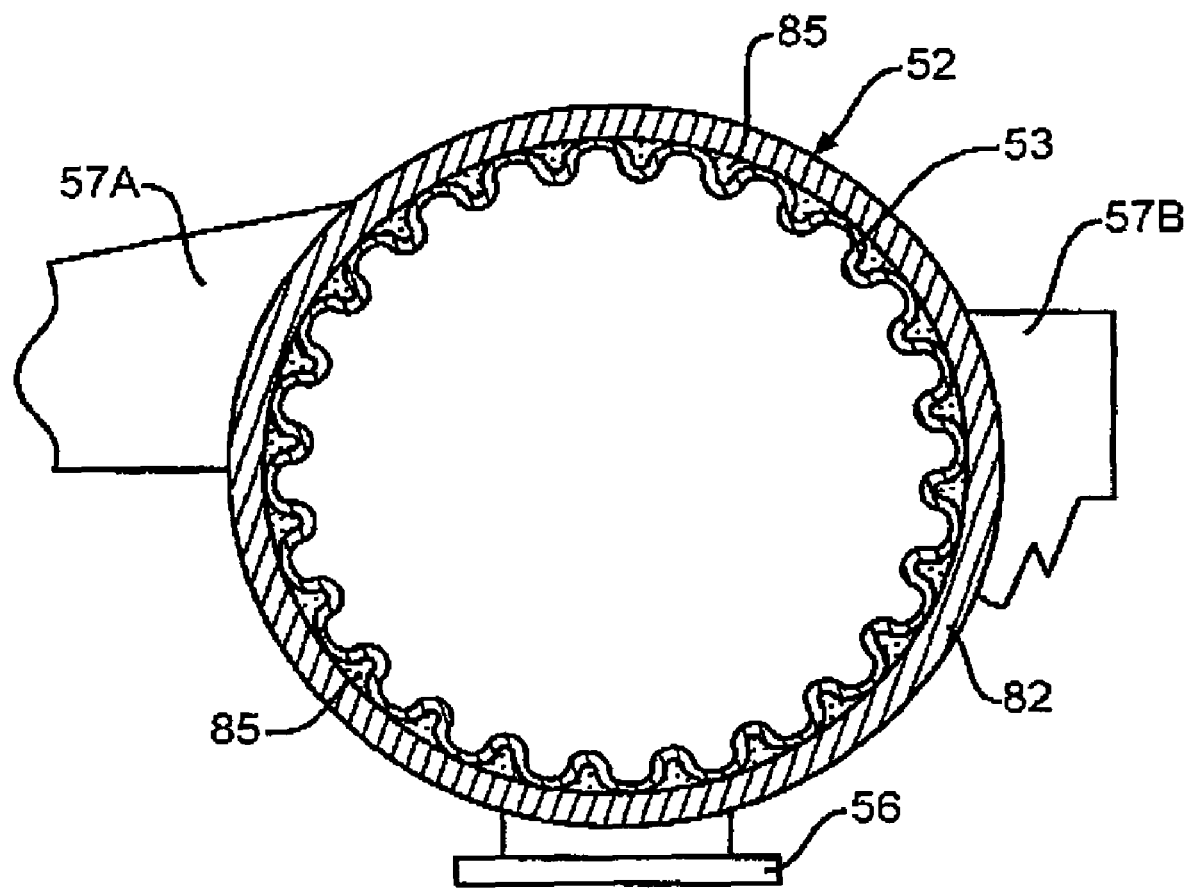
FIG. 4 is a partial cross-sectional view of the device shown in FIGS. 2 and 3 prepared according to the invention.

FIG. 4 is a partial cross-sectional view of a tubular wave chamber like wave chamber 52 in FIGS. 2 and 3. This wave chamber is shown totally lined with a dimpled liner 53, but only a portion of the dimpled liner 53 is the actual working surface for agglomerating the wet chopped segments. The liner 53 is shown with a backing material 85 between the backside of the liner 53 and the tubular shell 82. The backing material can be an elastomer, a rigidized elastomer, a rigidized slurry, a rigidized liquid, a particulate or granular material like sand, ground glass, most any mineral, or particles, wire or slivers of a metal, most typically sand or ground glass or a granular mineral.

Figure 5:
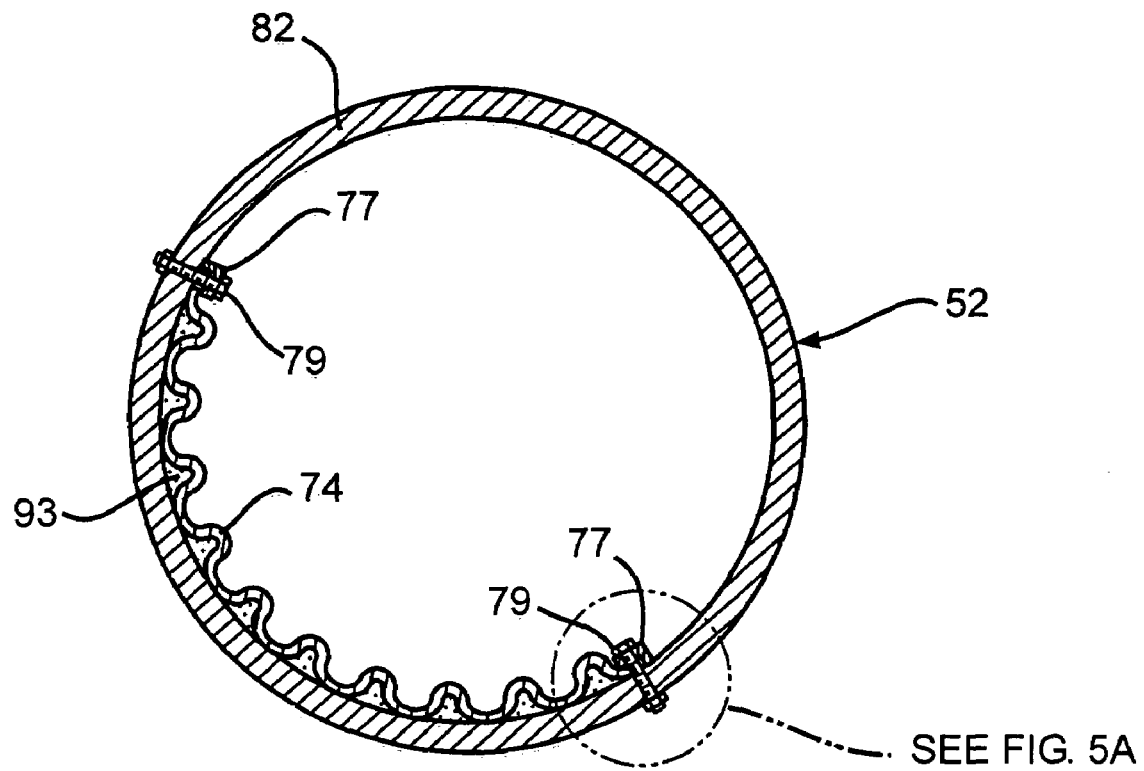
FIG. 5 is a partial cross-sectional view of the device shown in FIGS. 2 and 3 showing another embodiment of the invention.
Figure 5A:
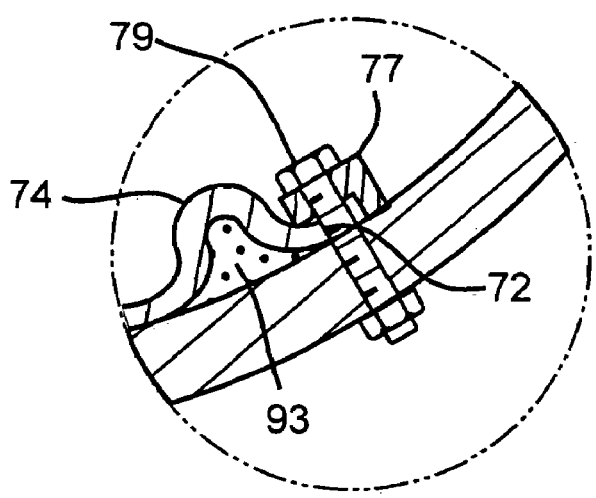

FIG. 5 is a cross-sectional view of a tubular wave chamber 52 that is only partially lined with a dimpled liner 74 working surface. The dimpled liner 74 is held in spaced apart attachments with the shell and bolted on liner clamps 77 down the length of the chamber 52 along each circumferential edge portion 72 of the liner 74. Bolts 79 pass through the shell 82 and the liner clamp 77 and can be tightened to hold the circumferential edge portions 72 tightly sealed against the inside of the curved shell 82. A backing, or fill, 93 is installed in this embodiment in the following manner, although other methods can be used as will be described later. A typical wave chamber 52, of the type offered by General Kinematics of Barrington, Ill., comes with the liner 74 already installed as shown in FIG. 5. The liner 74, in addition to the clamps 77, is also attached to the shell 82 at spaced apart locations. All of the bolts 79 are removed from one of the liner clamps 77, typically from the liner clamp 77 on the motor side of the shell 82, the liner clamp 77 at the highest elevation, and the liner clamp 77 is removed. The now loose circumferential edge portion 72 is now gently pulled inward and a 2 inch by 2 inch spacer is placed about 2-5 feet apart down the length of the liner to hold the edge portion and the loose portion of the liner away from the shell so that the backing material can be inserted. Next a particulate material such as ground glass having a particle size at least as fine as minus 140 mesh, more typically minus 200 mesh and most typically minus 325 mesh is carefully poured between the liner edge portion 72 and the shell 82 down the ten foot length of the liner 74 for units having an inside shell diameter of about 2 feet to about 3.5 feet. About 10-15 pounds of ground glass is used on a unit having a diameter of 36 inches. The spacers are removed allowing the liner edge portion 72 to spring back towards the shell 82 and the wave chamber 52 is vibrated with its motor(s) 64 for about 2 minutes to distribute and pack the particulate material.

During back filling of the backing material 93, the ends of the liner 74 are left loose to permit some backing material 93 to flow out of the gaps between the liner 74 and the shell 82 at the two ends of the unit to insure that the backing material 93 is thoroughly distributed. The above back filling steps are then repeated filling the fill material 93 to the circumferential top of the liner 74, the spacers are then removed from between the edge portion 72 and the shell 82 and the liner clamp 77 installed and the bolts 79 torqued down tightly. After the clamp 77 has been reinstalled, this gap at the discharge end of the unit is sealed with an elastomeric sealant. The upstream edge, which is spaced from the end of the vibrating curved surface, is left unsealed so that fiber can enter any opening and replenish any of the backing that may be lost or consolidated into a higher density. Any sealant can be used, for the downstream seal, but due to the vibration, an elastomeric sealant will hold up best and a silicone caulking is typically used because of its convenience in a caulk tube and its durability. After the sealant has set up or cured sufficiently, the wave chamber is ready to go into service. After the wave chamber 52 has run in vibration for several hours, the bolts 79 are again torqued tightly in case they may have become loose due to further packing of the fill material 93.

The above procedure can also be used to produce a substantially backing of small pieces of wire or slivers of metal. To back the liner with an elastomer, the same procedure is used as with the powder, but conventional elastomer precursor mixture is treated in the same manner as the powder above and after the elastomer is totally in place, the reaction takes place, either with time, heat or both, to convert the elastomer precursor to an elastomer. To back up the liner with a slurry or a liquid that is later rigidized, a liquid such as a conventional hydraulic cementious paste or slurry or a theromeset resin mixture containing a cross linking catalyst is applied to the gap between the liner and the curved supporting surface in the same manner as the powder. When completely filled and the clamp replaced, the rigidizing cross linking reaction is triggered with either time, heat or both to form a rigid backing.

Figure 6:
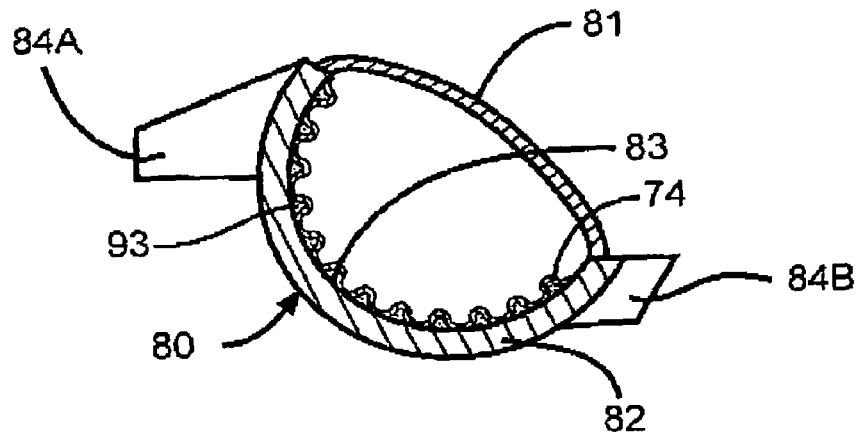
FIG. 6 is a cross section of a vibrating curved surface of still another agglomerating device suitable and prepared according to the invention.

While the vibrating curved surface 82 can be 360 degrees as shown in FIGS. 2-5, it need not be. A curved portion containing about 210 degrees is suitable as are smaller portions, but the capacity might be reduced somewhat. One embodiment is shown in FIG. 6, a partial cross section along the length of an elongated curved wave chamber 80. A concave working surface 83 is vibrated to act on a substantially non-compressible backing layer 93 and a dimpled liner 74 that acts on wet chopped strand segments to agglomerate them. The chamber 80 has a cover 81 that can be a straight plate or a slightly curved convex plate as shown in FIG. 5 or can be slightly curved concave. The wave chamber 80 also has a frame piece 84A attached to a top of one side and a second frame piece 84B attached to the top of the other side. The wave chamber 80 and frame pieces 84A and 84B are supported and vibrated in a same or similar manner as the cylindrical wave chamber 52 shown in FIGS. 2 and 3. The lining clamps 77 and bolts 79 are not shown on this embodiment, but can be like those shown in FIGS. 5 and/or 10.

Figure 7:
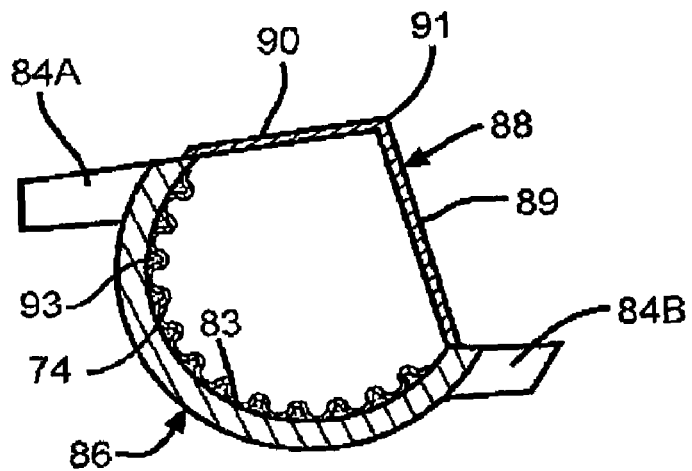
FIG. 7 is a cross section of a vibrating curved surface of still another agglomerating device suitable and prepared according to the invention.

Another possible embodiment is shown in FIG. 7 which is a partial cross section taken along the length of an elongated curved wave chamber 86. A concave working surface 87 is vibrated to act on a layer of substantially non-compressible material 99 and a dimpled liner 100 that acts on wet chopped strand segments to agglomerate them. The chamber 86 has a cover 88 that has at least two straight pieces 89 and 90 that intersect and join at an angle 91 as shown in FIG. 7. The wave chamber 86 also has the frame piece 84A attached to a top of one side and the second frame piece 84B attached to the top of the other side. The wave chamber 86 and the frame pieces 84A and 84B are supported and vibrated in a same or similar manner as the cylindrical wave chamber 52 shown in FIGS. 2 and 3. The lining clamps 77 and bolts 79 are not shown on this embodiment, but can be like those shown in FIGS. 5 and/or 10.

Figure 8:
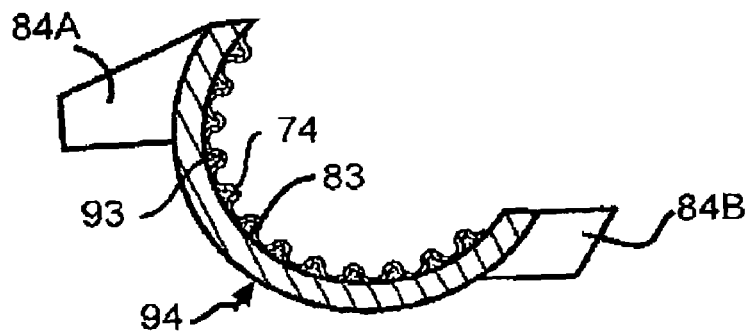
FIG. 8 is a cross section of a vibrating curved surface of still another agglomerating device suitable and prepared according to the invention.

A still further embodiment is shown in FIG. 8, a partial cross section along the length of an elongated curved wave chamber 94. The concave working surface 83 is vibrated to act on the layer of substantially non-compressible material 93 that backs up the dimpled liner 74 serves as a curved, vibrating working surface for wet chopped strand segments to agglomerate them. The wave chamber 94 has no cover, but instead is open to the atmosphere. An optional hood (not shown) could be mounted over the open top of the wave chamber 94 to catch and remove any fibers or moisture escaping out of the open top of the wave chamber 94 if desired. The wave chamber 94 also has the frame piece 84A attached to a top of one side and the second frame piece 84B attached to the top of the other side. The wave chamber 94 and the frame pieces 84A and 84B are supported and vibrated in a same or similar manner as the cylindrical wave chamber 52 shown in FIGS. 2 and 3. The lining clamps 77 and bolts 79 are not shown on this embodiment, but can be like those shown in FIGS. 5 and/or 10.

Figure 10:
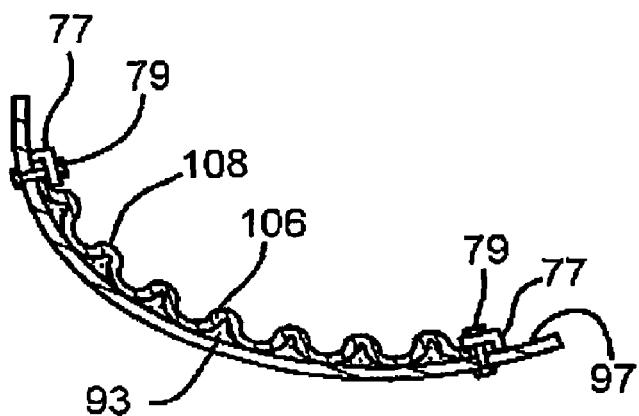
FIGS. 10 and 11 show optional curved, vibrating, working surfaces having two or more radii, prepared according to the invention.
Figure 11:
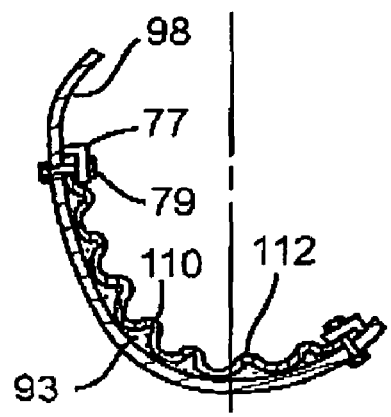

The radius of the curved working surface need not be constant as FIGS. 10 and 11 illustrate. A working surface 97 in FIG. 10 has two radii and a working surface 98 in FIG. 11 has more than two radii. Each embodiment also comprises the substantially non-compressible backing layer 93, a dimpled liner 106 (FIG. 10), a dimpled liner 110 (FIG. 11), both having a different configuration than the dimpled liner 74, providing working surfaces 108 and 112 respetively, held in place with liner clamps 77 and bolts 79, for acting on wet chopped fiber strand segments to agglomerate the segments.

On all of the many wave chamber devices disclosed above, the location of the vibrators and the array of coil springs between the vibrators and the wave chamber can be changed. For example, the elongated curved surface wave chamber can be supported on each side with coil springs mounted on a supporting frame and the array of coil springs, box channel and opposed vibrators can be attached to the wave chamber near the top of the wave chamber. The only critical requirement is an elongated curved working concave surface acted upon to produce a wave-like motion on chopped strand segments and agglomerates contacting the concave surface.

To practice the present invention using a system of the present invention as disclosed above, including the disclosure of FIGS. 2-11, conventional wet chopped fiber strand segments containing a conventional sizing for a plastic material and a moisture content in the range of about 10 to about 16 wt. percent, on a dry basis, and chopped into segments with any conventional chopper, such as shown in parts A and B of FIG. 1, are fed into an entry port of an agglomerator 46 containing an elongated curved working surface wave chamber such as the VibraDrum® device shown in FIGS. 2-11. The angle of declination and the feed rate are adjusted to produce a retention time in the agglomerator of between about 1-3 minutes. The actual feed rate, angle of declination and frequency will vary depending on the size of the wave chamber and the type of wet chopped strand segments being agglomerated and the agglomerate size desired.

The amplitude of vibration of the vibrating wave chamber can also be varied to produce the desired wave action and agglomerate size. Typically, an amplitude of about 0.625 inch is used, but this can be varied up or down as desired. A retention time longer than about 120 seconds, more typically longer than about 40-60 seconds could be used, but the minimum retention time to achieve the agglomerate size desired is best to avoid possible damage to the fibers, especially on the outside layer of the agglomerates. The length of the chamber will also affect retention time-and capacity of the wave chamber. Normally, the length of the wave chamber is fixed once a unit is installed. Wave chambers about 4 feet long and about 8 feet long are known to be satisfactory and no reason is known why other lengths, within reason, would not also be suitable.

If the agglomerates are larger than desired, several things can be done to reduce the agglomerate size as discussed above. Another thing that can be done to reduce agglomerate size is to reduce the moisture content of the chopped strand segments before they are fed into the wave chamber. This may require some drying of the segments between the chopper and the wave chamber because the addition of more water and/or sizing to the segments after chopping is not required in the present process.

The wet agglomerates 26 are fed into a dryer such as the conventional vibrating, fluid bed dryer shown in part D of FIG. 1, and preferably processed with a conventional screen sorter shown as part E in FIG. 1 to produce finished agglomerated chopped fiber strand reinforcement product. Typical moisture contents of the wet chopped fiber strand segments coming from the chopper are in the range of about 10 to about 15 wt. Percent, on a dry basis, i. e. based on the wt. of the dried segments. The agglomerated chopped fiber strand reinforcement product produced in the system of the invention and by the method of the invention had substantially improved uniformity of properties including flow characteristics and agglomerate sizes, number of fibers and diameters, compared with conventional agglomerated chopped fiber strand reinforcement products and agglomerated wet chopped strand made on the same agglomerator equipment as it was received from the manufacturer and before the dimpled liner working surface was backed up with a substantially non-compressible material.

After backing the liner 74 as described above with a minus 325 mesh ground glass powder, the flow times of wet chopped 4 mm long strand segments typically ranged between about 18 seconds and 20 seconds. Optical scanning of the agglomerates showed 95 to 114 agglomerates per 0.5 gram sample, a more desirable range and much improved uniformity. The variation of this product made with the liner 83 having a substantially non-compressible material 93 filling gaps between the liner 74 and the interior of the shell 82 showed a substantially reduced variation in agglomerate diameters and flow times. Flow was determined in each instance by timing how long it took a 1000 gram sample to flow through an FMC FM-T01-A-1 vibrating hopper having a 1½ inch diameter×6 inch straight outlet. It is desired to have about 80 to about 120 agglomerates per 0.5 gram sample. A competitive 4 mm long agglomerated product, when tested in the same manner, had 193 agglomerates per 0.5 gram sample. It was also apparent from the optical scanning tests that the agglomerate diameters varied substantially more in the competitive sample and in the samples made prior to backing up the dimpled liner than the samples taken after the liner was backed up according to the invention, in this embodiment with minus 20 mesh ground glass fibers. A screen analysis of this non-compressible material showed the following in weight percentages:

1%+20 mesh screen
5%+30 mesh
5%+40 mesh
57%+100 mesh
31%−100 mesh

While only preferred embodiments have been disclosed in detail above, many additional embodiments are possible and obvious to one of ordinary skill given the above disclosure and the claims are intended to include such embodiments and obvious equivalents thereof. Agglomerating parameters may have to be changed with some sizing compositions, but it will be within the skill of an ordinary artisan, given the above disclosure, to use the above disclosed invention to agglomerate wet chopped strands having all kinds of sizing compositions on the surface of the fibers.

The invention claimed is:

1. A method of agglomerating wet chopped fiber strand segments in an agglomerator having a curved, vibrating surface and a curved dimpled liner forming a working surface for the agglomeration covering at least a portion of the curved, vibrating surface, the agglomerator being a generally horizontal, non-rotating wave chamber comprising the elongated vibrating, curved working surface having one or more radii, said working surface having at least about 45 degrees on one side of an imaginary vertical centerline passing through the lowest point of said working surface, the improvement comprising using a layer of substantially non-compressible material between the curved, vibrating surface and the curved, dimpled liner to reduce or eliminate flexing of the curved, dimpled liner during vibration.

2. The method of claim 1 wherein the substantially non-compressible material is selected from a group consisting of an elastomer, a rigidized elastomer, a rigidized slurry, a rigidized liquid, fibers, a particulate material, particles, slivers, or wire of metal and mixtures of two or more of these materials.

3. The method of claim 1 wherein the substantially non-compressible material comprises a particulate material.

4. The method of claim 3 wherein the particulate material is as fine as at least minus 10 mesh.

5. The method of claim 3 wherein the particulate material is as line as at least 95 wt. percent minus 20 mesh.

6. The method of claim 3 wherein the particulate material is so fine that at least about 25 wt. percent passes through a 100 mesh screen.

7. The method of claim 3 wherein the particulate material comprises ground glass or ground glass fibers.

8. The method of claim 5 wherein the particulate material comprises ground glass or ground glass fibers.

* * * * *